United States Patent [19]

Bridenstine et al.

[11] Patent Number: 5,704,739

[45] Date of Patent: Jan. 6, 1998

[54] PORTABLE DRILL PRESS

[76] Inventors: Sam Bridenstine, 607 Ridge Rd., North Bend, Oreg. 97459; Carl Horner, P.O. Box 932, Monarch, Mont. 59463-0932

[21] Appl. No.: 709,828

[22] Filed: Sep. 10, 1996

[51] Int. Cl.$^6$ .................... B23B 45/12; B23B 45/14
[52] U.S. Cl. .................... 408/1 R; 408/101; 408/111; 408/137
[58] Field of Search .................... 408/101, 102, 408/111, 137, 138, 1 R

[56] References Cited

U.S. PATENT DOCUMENTS

| | | | |
|---|---|---|---|
| 2,287,354 | 6/1942 | Misch | 408/101 |
| 3,689,172 | 9/1972 | Stites | 408/241 S |
| 3,711,214 | 1/1973 | Cloutier | 408/137 |
| 4,197,041 | 4/1980 | Prewitt | 408/137 |
| 4,256,422 | 3/1981 | Theissig et al. | 408/241 S |
| 4,902,174 | 2/1990 | Thompson et al. | 408/101 |
| 5,078,552 | 1/1992 | Albel | 408/1 R |
| 5,131,793 | 7/1992 | Luebbert | 408/102 |
| 5,352,070 | 10/1994 | Tehrani | 408/102 |

*Primary Examiner*—Steven C. Bishop
*Attorney, Agent, or Firm*—Sughrue, Mion, Zinn, Macpeak & Seas, PLLC

[57] ABSTRACT

Holes are drilled into work pieces which are inconvenient to be mounted in a conventional machine shop drill press. Walking of the drill bit is controlled by an alignment guide 40 placed at the surface of the work piece which axially stabilizes the drill bit while it rotates. Downward axial force is applied to the drill bit by a screw action which translates rotational force applied by a wrench into an axial force. The device may be affixed to the work piece by clamping or spot welding. Downward axial force is applied by way of a pair of threadably engaged cylinders 42, 44. The outer cylinder 42 is integral with a plate 32 which is affixed to the work piece. The inner cylinder 44 has a portion 46 where rotational force may be applied. When the inner cylinder 44 is caused to rotate, the rotational force is translated into axial force by the threaded engagement of the inner cylinder 44 with the outer cylinder 42. Downward axial force bears upon the shoulder 94 of the drill bit 98 causing the drill bit to bore into the work piece.

19 Claims, 3 Drawing Sheets

PORTABLE DRILL PRESS

BACKGROUND OF THE INVENTION

1. Field of the Invention

The present invention is related to the field of machining. More specifically, the present invention is related to the field of boring holes into surfaces, such as metal or wood, using a drill.

2. The Background Art

Conventionally, holes are drilled using either a drill press or a portable drill. A conventional drill press is a large, bulky machine which is installed in a fixed place, such as a machine shop. Items which are to be machined using a conventional drill press must be brought to the place where the drill press is installed and clamped, or otherwise affixed, onto the drill press. Conventional drill presses provide a means for making holes at precise positions in a work piece, assuming that the work piece is properly mounted onto the drill press. However, conventional drill presses have the obvious disadvantage that they are not readily movable. Thus, they cannot be brought to be properly aligned with an immovable work piece without a great deal of difficulty.

Portable drills, in contrast, may be brought to the piece which is to be machined. Portable drills are generally small enough to be lifted, carried, and operated by one person, and are often hand-held. Portable drills are operated by mounting a drill bit into the chuck of the drill, bringing the bit into alignment with the surface to be drilled at the desired position and angle of the hole, and rotating the drill bit so as to bore into the surface. One disadvantage inherent to portable drills is that they are imprecise; they do not reliably place the hole where it is desired to be. This is because the positioning of the drill bit during drilling is dependent upon the operator being able to hold the drill alignment steady. Often the drill bit "walks" out of alignment with the desired position of the hole while the bit is rotating, despite the best efforts of the operator. Also, the speed with which the drill progresses through the work piece is limited to how much force the operator can apply by hand.

Some conventional solutions have been attempted with mixed degrees of success. Extra handles have been added to portable drills at different locations on the drill in an attempt to help the operator maintain more control over the drill's alignment. This has not been a satisfactory solution as it only provides the operator of the drill with a slight improvement in mechanical advantage.

Also, a smaller "pilot hole" may be drilled as a guide for a larger drill bit. This method suffers from two disadvantages. First, it depends upon the operator being able to maintain proper alignment while drilling the pilot hole, which fails to escape the essential underlying problem of aligning portable drills. Second, it is time consuming since it means the hole has to be drilled twice, and since an extra procedural step of changing bits is added.

Conventional drills, both drill presses and portable drills, are quite inadequate when confronted with the problem of drilling "half holes." A half hole situation arises when a hole has been drilled in the wrong place on a work piece and a new hole must be drilled such that it overlaps the erroneous hole. An attempt to drill the new hole in the right location with either a portable drill or a drill press will invariably result in the drill bit walking into the first, erroneous hole.

So-called "mag-mount" drills have been devised to secure a drill to a work piece using magnetic attraction. These devices have some shortcomings. Mag-mount drills are bulky and cannot fit into small spaces. Their added weight makes them a challenge to transport around between job sites. Most significantly, as they depend upon magnetic attraction for securing force, they are useful only for work pieces which have ferromagnetic properties, such as iron and steel work pieces.

BRIEF SUMMARY OF THE INVENTION

The present invention solves the problems presented by conventional drilling apparatusses by providing a way to precisely hold a drill bit in a predetermined location while applying an axial force to urge the drill bit into engagement with the surface being bored into.

Precision of hole placement is enforced by an alignment guide which is located immediately at the work piece surface and which holds the drill bit on a fixed longitudinal axis while it is rotating. Thus, the drill bit is prevented from walking to a different location once it has been set within the alignment guide.

Application of axial force to the drill bit is facilitated by a pair of hollow cylinders which telescope with respect to one another via a screw action. As the inner drill bit engaging pipe nipple cylinder is screwed downward into the outer pipe collar cylinder, the drill bit is forced by the inner cylinder to move downward into the work piece.

It is an object of the present invention to provide a drill press which is portable.

It is a further object of the present invention to provide for drilling of holes in a work piece at precise locations by eliminating walking of the drill bit.

It is a further object of the present invention to combine control of drill bit alignment with application of substantial axial force to shorten drilling time.

It is a further object of the present invention to provide an economically efficient drill press.

It is a further object of the present invention to provide a means for reliably drilling half-holes without the drill bit walking into a neighboring, previously-drilled hole.

DETAILED DESCRIPTION OF THE INVENTION

Figure 1:
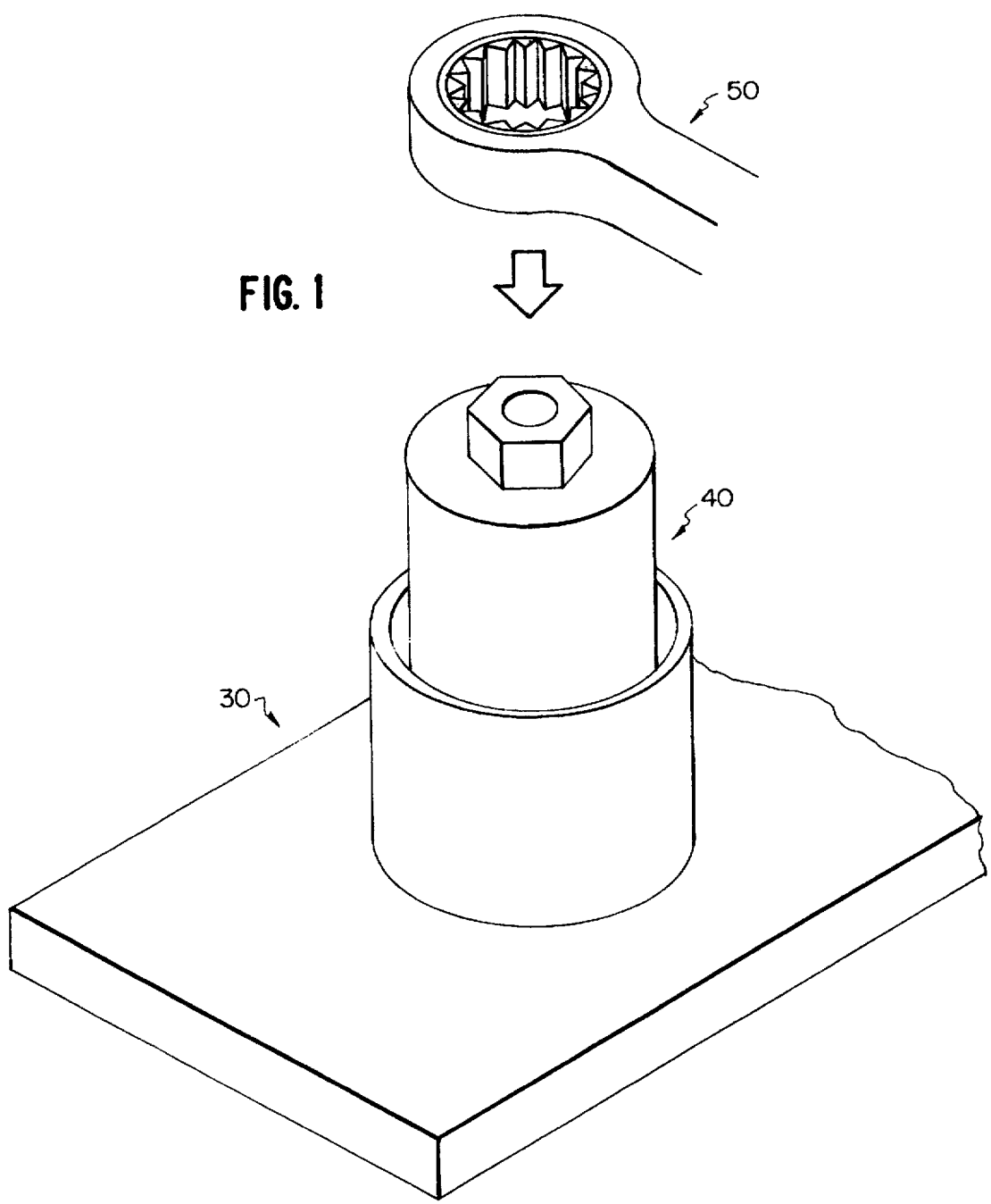
FIG. 1 shows a perspective view of the portable drill press according to a preferred embodiment of the invention.
Figure 2:
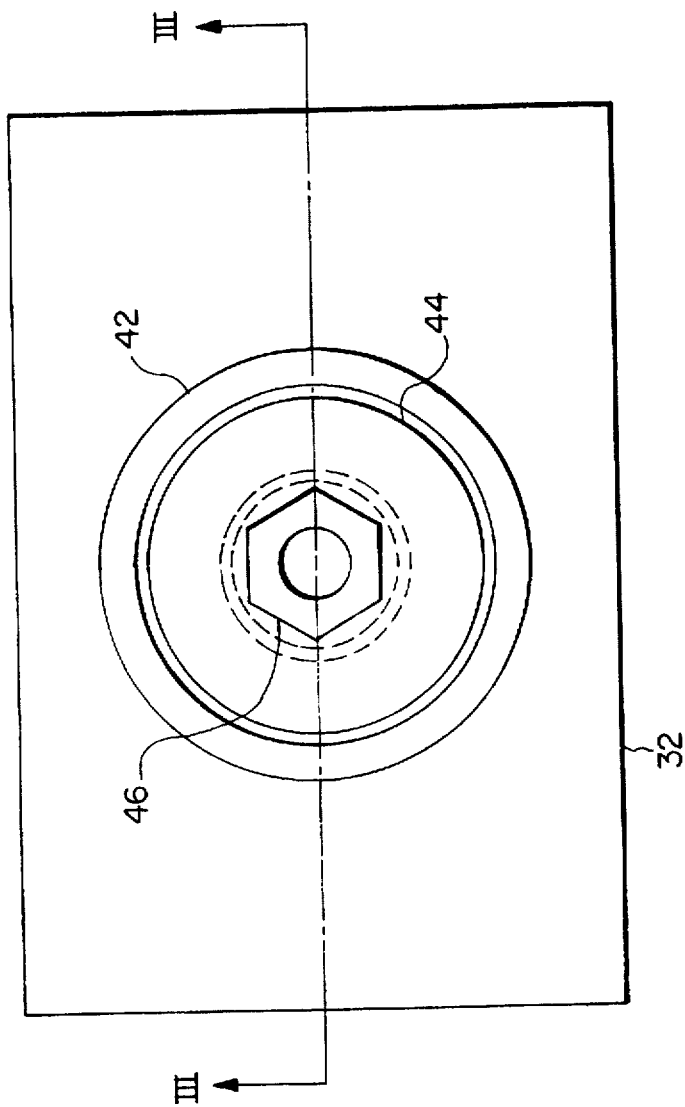
FIG. 2 shows a top view of the portable drill press of FIG. 1.

The single general inventive concept encompasses both a method for machining holes and an apparatus for carrying out the method. Preferred embodiments of both the apparatus and the method are described in detail.

1. The Structure of the Apparatus

The portable drill press has of two main elements. The first element is an alignment means 30 for aligning the drill bit 98 with the hole to be drilled. The alignment means 30 may be embodied as a bit alignment guide formed as a base plate 32. The second element is an applicator means 40 for applying an axial force to the bit. The applicator means 40 may be embodied as an axial bit force applicator formed as a pair of threadably engaging telescoping hollow cylinders 42, 44. These two main elements are connected to one another in alignment with one another.

The alignment structure of the drill press is preferably constructed from a base plate 32 which is flat. It may also be curved so as to conform to the shape of a curved surface (such as a pipe) which is desired to be drilled. The base plate 32 has a hole 34 for allowing the drill bit 98 to pass through. The diameter of the hole 34 in the base plate 32 is chosen slightly larger than the diameter of the drill bit 98 being used with the portable drill press. Although the base plate 32 may be made to be most any size, a generally useful size has been discovered to be two inches wide by ten inches long by ⅛ inch thick.

In order to allow for the use of different size drill bits, the hole 34 can take different sizes. According to a preferred embodiment of the invention, a set of interchangeable inserts 36 having different diameter holes therein are insertable into the base plate. Each insert 36 has a lip 38 around its periphery for holding it in place.

An alternative embodiment for providing different size holes in the alignment guide is for the base plate 32 to be embodied as a unitary plate having a fixed hole size. Embodied thusly the base plate 32 should only be used with a single size drill bit. Changing the size of the drill bit would mean using a different base plate 32 which has the proper size hole. The base plate 32 may made to be readily interchangeable by attaching it to the outer hollow cylinder 42 with bolts (not shown, welded into the base plate 32) through tabs (not shown, welded on opposite sides of the pipe collar 42). On the other hand, each of a set of interchangeable base plates 32 may be welded to an outer hollow cylinder 42, with changes of base plates accomplished by unthreading and threading the outer cylinder/base plate combinations to the inner hollow cylinder 44.

The force applicator structure of the drill press is preferably constructed of an outer hollow cylinder 42 having internal threads which is threadably engaged with an inner hollow cylinder 44 having external threads. The force applicator structure also includes a rotational force coupler 46 attached to the top of the inner cylinder 44. The outer cylinder 42 is shown integral with the base plate 32.

The outer cylinder 42 may be a pipe which is internally threaded substantially all the way through and is welded to the base plate 32. The inner cylinder 44 is a pipe which is constructed so as to be threaded (about three rotations) at its distal end. A limited number of thread rotations are placed on the inner cylinder 44 so as to prevent excessive friction between the two cylinder elements 42, 44.

Figure 3:
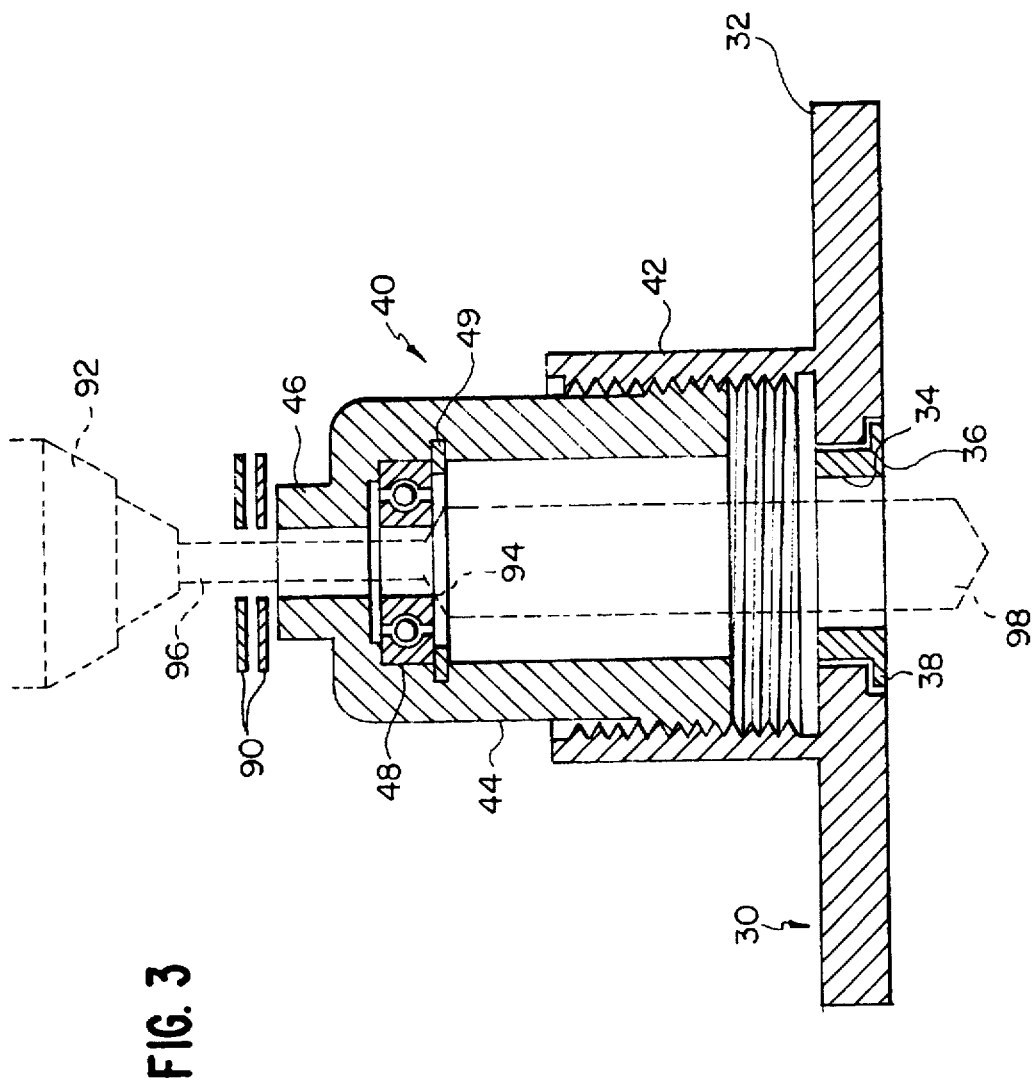
FIG. 3 shows a sectional view of the portable drill press of through section A—A indicated in FIG. 2. It also shows a drill chuck and drill bit in phantom.

At the proximal or top end the inner cylinder 44 is constructed to accept a bearing 48 and rotational force coupler 46. The inner cylinder 44, bearing 48, and rotational force coupler 46 are aligned with one another so as to allow the shank 96 of a drill bit 98 to pass through. The bearing 48 may be held in the inner cylinder 44 by a number of mechanisms: set screws, a machined groove with a snap ring, heat shrink using an interference fit. FIG. 3 illustrates a snap ring 49 in a machined groove for holding the bearing 48 in place.

Force is applied to the drill bit 98 by the bearing 48 (mounted in the inner cylinder 44) at the shoulder or collar 94. The invention is appropriately used with drill bits which have a shoulder or collar 94 against which axial force may be applied.

The inner cylinder 44 may be formed by any method, such as machining from stock or casting. A particularly economical method for forming the inner cylinder 44 is taking an appropriate size pipe nipple, machining off all the threads except the last three on the distal end and welding an annular cap on the top of the proximal end.

The rotational force coupler 46 is preferably embodied as a hexagonal shaped nut affixed to the top of the inner cylinder. The hex nut geometry allows for the application of rotational force to the device using a common wrench 50 as a force applying handle. Although any wrench 50 may be used to function as an adequate handle, a box end ratchet wrench performs particularly well. The box end ratchet wrench 50 enables speedy, effective use of the portable drill press in confined spaces where full 360° rotational freedom for a handle cannot be obtained. Alternatively, other shapes, such as square, may be used for the rotational force coupler 46. As another alternative, the rotational force coupler 46 could be circular and have one or more holes for accepting set screws or pins for affixing handles to the device. As yet a further alternative, a simple cantilevered handle (not shown) could be permanently affixed to the inner cylinder 44.

The portable drill press works like this: The shoulder or collar 94 on the drill bit 98 rides on the ball bearing 48 the bit and is guided by the hole 34 in the base plate 32. When the inner cylinder 44 is threaded into the outer cylinder 42 the bearing 48 applies force to the drill bit 98. The drill bit 98 cannot go any place except through the work piece.

The device according to the invention may also be used in combination with a conventional drill press so as to enhance the precision of location of holes being drilled by the conventional press. Although this invention is primarily for use with hand-held drills, either electrically or pneumatically powered, so as to be portable, it may be adapted to be used on a workbench. As an alternative, the device according to the invention may be part of a freestanding floorstand.

2. The Steps of the Method

According to the invention holes may be drilled at precise locations in work pieces. The work pieces need not be moved since the apparatus for performing the method is portable and may be brought to the work piece. The method of drilling holes in a surface according to the present invention includes the following steps:

(a) providing a drill bit 98 having a shank 96 and a collar 94;

(b) providing a drill (not shown) having a chuck 92 for holding drill bits;

(c) providing a bit alignment guide 30 and an axial bit force applicator 40;

(d) inserting the shank 96 of the drill bit 98 through the axial bit-force applicator 40 and securing the shank 96 in the drill chuck 92;

(e) securing the bit alignment guide 30 in a desired position on the surface (not shown);

(f) operating the drill so as to cause the drill bit 98 to rotate; and (g) applying rotational force to the axial bit force applicator 40 so as to cause axial force to be applied to the collar 94 of the drill bit 98.

The bit alignment guide may be secured to the surface to be drilled by a variety of methods: clamping, spot welding, bolting to existing holes, etc.

If a box end wrench is used as the handle, it must be placed on the hexagonal rotational force coupler before the shank of the drill bit is secured in the chuck.

It is also advantageous to use thrust washers (or bearings) 90 disposed about the shank 96 of the drill bit and disposed between the drill chuck 92 and the rotational force coupler 46 (see FIG. 3). This provides an element of safety when the drill 98 breaks through the work piece and the still spinning drill chuck 92 bears down against the top of the portable drill press.

The device is appropriately used with drill bits which have a shoulder or collar 94.

When drilling, it is preferable to operate the drill at a constant, wide-open speed. This removes the metal chips and keeps the drill bit clean of metal shavings. It is not necessary to form a pilot hole before drilling. The use of drilling oil is optional. The portable drill press can bore a ⅝ inch hole through a one inch plate in about 80 seconds.

What is claimed is:

1. An apparatus for use with a drill bit for drilling a hole in a surface, said apparatus comprising:

a bit alignment guide; and an axial bit force applicator, connected to and in alignment with said bit alignment guide, wherein said bit alignment guide comprises:
a base plate having a hole therethrough which has a diameter slightly greater than a diameter of the drill bit, and wherein said axial bit force applicator comprises:
a pipe collar having internal threads;
a pipe nipple having external threads, threadably engaged with said pipe collar; and
a rotational force coupler attached to said pipe nipple; and wherein said pipe collar is connected to said base plate.

2. An apparatus according to claim 1, wherein:

said pipe nipple has a proximal end at which said rotational force coupler is disposed; and said pipe nipple has a distal end at which said external threads are disposed.

3. An apparatus according to claim 1, wherein said rotational force coupler is hexagonal in shape so as to be engagable with a wrench.

4. An apparatus according to claim 1, said apparatus further comprising:

a handle which is engaged with said rotational force coupler, whereby a rotational force applied to said handle is coupled to said axial bit force applicator so as to apply axial force to the drill bit.

5. An apparatus according to claim 4, wherein said handle is a wrench.

6. An apparatus according to claim 4, wherein said handle is a ratcheting box end wrench.

7. An apparatus according to claim 1, wherein said axial bit force applicator further comprises:

a bearing mounted in said pipe nipple, whereby said axial bit force applicator applies axial force to the drill bit while the drill bit is rotating.

8. An apparatus according to claim 1, wherein the apparatus is portable.

9. An apparatus for use with a drill bit for drilling a hole in a surface, said apparatus comprising:

a bit alignment guide; and an axial bit force applicator, connected to and in alignment with said bit alignment guide, wherein said axial bit force applicator comprises:
a pipe collar having internal threads;
a pipe nipple having external threads, threadably engaged with said pipe collar; and
a rotational force coupler attached to said pipe nipple.

10. An apparatus according to claim 9, wherein said bit alignment guide comprises:

a base plate having a hole therethrough which has a diameter slightly greater than a diameter of the drill bit.

11. An apparatus according to claim 9, wherein said bit alignment guide comprises:

a base plate having a hole therethrough which has a diameter slightly greater than a diameter of the drill bit;

and wherein said pipe collar is connected to said base plate.

12. An apparatus according to claim 11, wherein:

said pipe nipple has a proximal end at which said rotational force coupler is disposed; and said pipe nipple has a distal end at which said external threads are disposed.

13. An apparatus according to claim 11, wherein said rotational force coupler is hexagonal in shape so as to be engagable with a wrench.

14. An apparatus according to claim 9, said apparatus further comprising:

a handle which is engaged with said rotational force coupler, whereby a rotational force applied to said handle is coupled to said axial bit force applicator so as to apply axial force to the drill bit.

15. An apparatus according to claim 14, wherein said handle is a wrench.

16. An apparatus according to claim 14, wherein said handle is a ratcheting box end wrench.

17. An apparatus according to claim 9, wherein said axial bit force applicator further comprises:

a bearing mounted in said pipe nipple, whereby said axial bit force applicator applies axial force to the drill bit while the drill bit is rotating.

18. An apparatus according to claim 9, wherein the apparatus is portable.

19. A method of drilling holes in a surface comprising the steps of:

(a) providing a drill bit having a shank and a collar;

(b) providing a drill having a chuck for holding drill bits;

(c) providing a bit alignment guide and an axial bit force applicator;

(d) inserting the shank of the drill bit through the axial bit force applicator and securing the shank in the drill chuck;

(e) securing the bit alignment guide in a desired position on the surface;

(f) operating the drill so as to cause the drill bit to rotate; and (g) applying rotational force to the axial bit force applicator so as to cause axial force to be applied to the collar of the drill bit.

* * * * *